United States Patent
Moribe et al.

(10) Patent No.: US 8,392,367 B2
(45) Date of Patent: Mar. 5, 2013

(54) MAP UPDATING SYSTEM

(75) Inventors: Isao Moribe, Okazaki (JP); Tomoki Kodan, Nagoya (JP); Hironobu Sugimoto, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 12/226,734

(22) PCT Filed: Aug. 30, 2007

(86) PCT No.: PCT/JP2007/067362
§ 371 (c)(1),
(2), (4) Date: Jan. 6, 2009

(87) PCT Pub. No.: WO2008/029866
PCT Pub. Date: Mar. 13, 2008

(65) Prior Publication Data
US 2009/0172031 A1   Jul. 2, 2009

(30) Foreign Application Priority Data

Sep. 1, 2006   (JP) .................................. 2006-237182

(51) Int. Cl.
*G06F 17/30* (2006.01)
(52) U.S. Cl. ........ 707/634; 707/791; 707/802; 707/613; 707/E17.005; 707/E17.018
(58) Field of Classification Search ........... 707/999.107, 707/999.002, E17.005, E17.018, 791, 802, 707/613, 634
See application file for complete search history.

(56) References Cited

U.S. PATENT DOCUMENTS

| 6,820,259 | B1* | 11/2004 | Kawamata et al. ........... 717/173 |
| 2001/0019309 | A1* | 9/2001 | Saeki et al. .................... 340/995 |
| 2003/0005161 | A1* | 1/2003 | Chen et al. ..................... 709/248 |
| 2004/0133343 | A1 | 7/2004 | Hashida et al. |
| 2004/0193370 | A1* | 9/2004 | Umezu et al. ................. 701/210 |
| 2004/0250026 | A1* | 12/2004 | Tanoue ......................... 711/151 |
| 2005/0050538 | A1 | 3/2005 | Kawamata et al. |
| 2005/0193248 | A1* | 9/2005 | Idei et al. ......................... 714/13 |
| 2007/0244636 | A1* | 10/2007 | Horikami ...................... 701/208 |

FOREIGN PATENT DOCUMENTS

| EP | 1 431 712 A2 | 6/2004 |
| JP | A-2004-198841 | 7/2004 |
| JP | A-2006-047444 | 2/2006 |
| JP | A-2006-220524 | 8/2006 |

OTHER PUBLICATIONS

Korean Patent Office, Opinion Submission Notification mailed Nov. 8, 2010 in Korean Patent Application No. 10 2008-7026088 w/English-language Translation.
Mar. 6, 2012 Office Action issued in Japanese Patent Application No. 2006-237182 (with partial translation).
Mar. 20, 2012 Office Action issued in Chinese Patent Application No. 2007-80013603.3 (with partial translation).

\* cited by examiner

*Primary Examiner* — Fred I Ehichioya
*Assistant Examiner* — Shiow-Jy Fan
(74) *Attorney, Agent, or Firm* — Oliff & Berridge, PLC

(57) ABSTRACT

A map updating system that stores map data and a priority sequence table, acquires first update data and second update data of the map data according to the priority sequence table, and updates the map data based on the first update data and second update data according to the priority sequence table.

12 Claims, 10 Drawing Sheets

FIG. 5

PRIORITY SEQUENCE SETTING TABLE (1) — 53

<table>
<tr><td colspan="2" rowspan="2"></td><td>SUBSEQUENT EVENT</td></tr>
<tr><td>COMMUNICATION MODULE (STARTING DATA ACQUISITION)</td></tr>
<tr><td rowspan="13">PRIOR EVENT</td><td>COMMUNICATION MODULE (DURING DATA ACQUISITION)</td><td>NO CONFLICT</td></tr>
<tr><td>COMMUNICATION MODULE (DURING SUSPENSION OF DATA ACQUISITION)</td><td>(1) "SEARCH CONDITIONS ARE IDENTICAL" AND "VERSION OF INCREMENTAL UPDATE DATA DURING SUSPENSION OF ACQUISITION AND VERSION OF INCREMENTAL UPDATE DATA ACQUIRED SUBSEQUENTLY ARE IDENTICAL"<br>⟹ EXECUTE ONLY PRIOR EVENT<br>(2) "SEARCH CONDITIONS ARE IDENTICAL" AND "VERSION OF INCREMENTAL UPDATE DATA ACQUIRED SUBSEQUENTLY IS NEWER THAN VERSION OF INCREMENTAL UPDATE DATA DURING SUSPENSION OF ACQUISITION"<br>⟹ EXECUTE ONLY SUBSEQUENT EVENT<br>(3) "SEARCH CONDITIONS ARE DIFFERENT"<br>⟹ PRIORITIZE AND EXECUTE PRIOR EVENT<br>    (HOWEVER, CARRY OUT SIMULTANEOUSLY WITH REPLACEMENT OF DB)</td></tr>
<tr><td>COMMUNICATION MODULE (DURING UPDATE)</td><td rowspan="2">PRIORITIZE AND EXECUTE PRIOR EVENT (HOWEVER, CARRY OUT SIMULTANEOUSLY WITH REPLACEMENT OF DB)</td></tr>
<tr><td>COMMUNICATION MODULE (DURING SUSPENSION OF UPDATE)</td></tr>
<tr><td>COMMUNICATION MODULE (AFTER UPDATE COMPLETION AND BEFORE REPLACEMENT)</td><td>(1) "CASE OF COMMUNICATION START IN WHICH SUBSEQUENT EVENT IT DUE TO ACC BEING TURNED ON"<br>⟹ PRIORITIZE AND EXECUTE PRIOR EVENT<br>(2) "CASE IN WHICH COMMUNICATION OF SUBSEQUENT EVENT IS STARTED UNDER OTHER CONDITIONS"<br>⟹ SIMULTANEOUSLY EXECUTE REPLACEMENT OF DB AFTER EXECUTING PRIOR EVENT</td></tr>
<tr><td>MOBILE TELEPHONE (DURING DATA ACQUISITION)</td><td rowspan="4">NO CONFLICT</td></tr>
<tr><td>MOBILE TELEPHONE (DURING SUSPENSION OF DATA ACQUISITION)</td></tr>
<tr><td>MOBILE TELEPHONE (DURING UPDATE)</td></tr>
<tr><td>MOBILE TELEPHONE (DURING SUSPENSION OF UPDATE)</td></tr>
<tr><td>MOBILE TELEPHONE (AFTER UPDATE COMPLETION AND BEFORE REPLACEMENT)</td><td></td></tr>
<tr><td>CD-R(DURING DATA ACQUISITION)</td><td>EXECUTE ONLY PRIOR EVENT</td></tr>
<tr><td>CD-R (DURING SUSPENSION OF DATA ACQUISITION)</td><td>EXECUTE ONLY SUBSEQUENT EVENT</td></tr>
<tr><td>CD-R(DURING UPDATE)</td><td rowspan="3">EXECUTE ONLY PRIOR EVENT</td></tr>
<tr><td>CD-R (DURING SUSPENSION OF UPDATE)</td></tr>
<tr><td>CD-R (AFTER UPDATE COMPLETION AND BEFORE REPLACEMENT)</td></tr>
<tr><td>COMPREHENSIVE UPDATING</td><td>NO CONFLICT</td></tr>
</table>

FIG. 6

PRIORITY SEQUENCE SETTING TABLE (2) ~53

| | | SUBSEQUENT EVENT |
|---|---|---|
| | | MOBILE TELEPHONE (STARTING DATA ACQUISITION) |
| PRIOR EVENT | COMMUNICATION MODULE (DURING DATA ACQUISITION) | NO CONFLICT |
| | COMMUNICATION MODULE (DURING SUSPENSION OF DATA ACQUISITION) | |
| | COMMUNICATION MODULE (DURING UPDATE) | |
| | COMMUNICATION MODULE (DURING SUSPENSION OF UPDATE) | |
| | COMMUNICATION MODULE (AFTER UPDATE COMPLETION AND BEFORE REPLACEMENT) | |
| | MOBILE TELEPHONE (DURING DATA ACQUISITION) | NO CONFLICT |
| | MOBILE TELEPHONE (DURING SUSPENSION OF DATA ACQUISITION) | (1) "SEARCH CONDITIONS ARE IDENTICAL"AND " VERSION OF INCREMENTAL UPDATE DATA DURING SUSPENSION OF ACQUISITION AND VERSION OF INCREMENTAL UPDATE DATA ACQUIRED SUBSEQUENTLY ARE IDENTICAL" ⟹ EXECUTE ONLY PRIOR EVENT<br>(2) "SEARCH CONDITIONS ARE IDENTICAL"AND " VERSION OF INCREMENTAL UPDATE DATA ACQUIRED SUBSEQUENTLY IS NEWER THAN VERSION OF INCREMENTAL UPDATE DATA DURING SUSPENSION OF ACQUISITION" ⟹ EXECUTE ONLY SUBSEQUENT EVENT<br>(3) "SEARCH CONDITIONS ARE DIFFERENT" ⟹ EXECUTE ONLY SUBSEQUENT EVENT |
| | MOBILE TELEPHONE (DURING UPDATE) | NO CONFLICT |
| | MOBILE TELEPHONE (DURING SUSPENSION OF UPDATE) | |
| | MOBILE TELEPHONE (AFTER UPDATE COMPLETION AND BEFORE REPLACEMENT) | PRIORITIZE PRIOR EVENT AND EXECUTE (HOWEVER, CARRY OUT REPLACEMENT OF DB SIMULTANEOUSLY) |
| | CD-R (DURING DATA ACQUISITION) | NO CONFLICT |
| | CD-R (DURING SUSPENSION OF DATA ACQUISITION) | EXECUTE ONLY SUBSEQUENT EVENT |
| | CD-R (DURING UPDATE) | NO CONFLICT |
| | CD-R (DURING SUSPENSION OF UPDATE) | |
| | CD-R (AFTER UPDATE COMPLETION AND BEFORE REPLACEMENT) | PRIORITIZE AND EXECUTE PRIOR EVENT (HOWEVER, CARRY OUT REPLACEMENT OF DB SIMULTANEOUSLY) |
| | COMPREHENSIVE UPDATING | NO CONFLICT |

FIG. 7

PRIORITY SEQUENCE SETTING TABLE (3) — 53

| | | SUBSEQUENT EVENT | |
|---|---|---|---|
| | | CD-R (CONFIRMATION OF INSERTION) | CD-R EJECT |
| PRIOR EVENT | COMMUNICATION MODULE (DURING DATA ACQUISITION) | EXECUTE ONLY SUBSEQUENT EVENT | NO CONFLICT |
| | COMMUNICATION MODULE (DURING SUSPENSION OF DATA ACQUISITION) | | |
| | COMMUNICATION MODULE (DURING UPDATE) | PRIORITIZE AND EXECUTE PRIOR EVENT (HOWEVER, CARRY OUT REPLACEMENT OF DB SIMULTANEOUSLY) NOTE THAT INSERTION OF CD-R IS CONDITION | |
| | COMMUNICATION MODULE (DURING SUSPENSION OF UPDATE) | | |
| | COMMUNICATION MODULE (AFTER UPDATE COMPLETION AND BEFORE REPLACEMENT) | | |
| | MOBILE TELEPHONE (DURING DATA ACQUISITION) | EXECUTE ONLY SUBSEQUENT EVENT (HOWEVER, CONFIRM WHETHER PRIOR EVENT IS TO BE CANCELLED) | NO CONFLICT |
| | MOBILE TELEPHONE (DURING SUSPENSION OF DATA ACQUISITION) | | |
| | MOBILE TELEPHONE (DURING UPDATE) | PRIORITIZE AND EXECUTE PRIOR EVENT (HOWEVER, CARRY OUT REPLACEMENT OF DB SIMULTANEOUSLY) NOTE THAT INSERTION OF DC-R IS CONDITION | |
| | MOBILE TELEPHONE (DURING SUSPENSION OF UPDATE) | | |
| | MOBILE TELEPHONE (AFTER UPDATE COMPLETION AND BEFORE REPLACEMENT) | | |
| | CD-R (DURING DATA ACQUISITION) | NO CONFLICT | EXECUTE SUBSEQUENT EVENT |
| | CD-R (DURING SUSPENSION OF DATA ACQUISITION) | EXECUTE ONLY SUBSEQUENT EVENT | |
| | CD-R (DURING UPDATE) | PRIORITIZE AND EXECUTE PRIOR EVENT (HOWEVER, CARRY OUT REPLACEMENT OF DB SIMULTANEOUSLY) | EXECUTE SUBSEQUENT EVENT (HOWEVER, CARRY OUT REPLACEMENT OF DB) |
| | CD-R (DURING SUSPENSION OF UPDATE) | | |
| | CD-R (AFTER UPDATE COMPLETION AND BEFORE REPLACEMENT) | | |
| | COMPREHENSIVE UPDATING | NO CONFLICT | NO CONFLICT |

FIG. 8

PRIORITY SEQUENCE SETTING TABLE (4)     ~53

| | | SUBSEQUENT EVENT | |
|---|---|---|---|
| | | COMPREHENSIVE UPDATING | ACC IS OFF |
| PRIOR EVENT | COMMUNICATION MODULE (DURING DATA ACQUISITION) | EXECUTE ONLY SUBSEQUENT EVENT | EXECUTE SUBSEQUENT EVENT AND RESUME START OF PRIOR EVENT AFTER ACC IS TURNED ON |
| | COMMUNICATION MODULE (DURING SUSPENSION OF DATA ACQUISITION) | | |
| | COMMUNICATION MODULE (DURING UPDATE) | EXECUTE ONLY SUBSEQUENT EVENT (COMPARE VERSION OF INCREMENTAL UPDATE DATA WHOSE ACQUISITION HAS BEEN COMPLETED AFTER COMPREHENSIVE UPDATING HAS COMPLETED, AND UPDATE IF NECESSARY) | EXECUTE SUBSEQUENT EVENT AND RESTART PRIOR EVENT AFTER ACC IS TURNED ON |
| | COMMUNICATION MODULE (DURING SUSPENSION OF UPDATE) | | |
| | COMMUNICATION MODULE (AFTER UPDATE COMPLETION AND BEFORE REPLACEMENT) | | |
| | MOBILE TELEPHONE (DURING DATA ACQUISITION) | EXECUTE ONLY SUBSEQUENT EVENT | EXECUTE SUBSEQUENT EVENT, AND STOP ACQUISITION OF DATA |
| | MOBILE TELEPHONE (DURING SUSPENSION OF DATA ACQUISITION) | | |
| | MOBILE TELEPHONE (DURING UPDATE) | EXECUTE ONLY SUBSEQUENT EVENT (COMPARE VERSION OF INCREMENTAL UPDATE DATA WHOSE ACQUISITION HAS BEEN COMPLETED AFTER COMPREHENSIVE UPDATING HAS COMPLETED, AND UPDATE IF NECESSARY) | EXECUTE SUBSEQUENT EVENT, AND RESTART PRIOR EVENT AFTER ACC IS TURNED ON |
| | MOBILE TELEPHONE (DURING SUSPENSION OF UPDATE) | | |
| | MOBILE TELEPHONE (AFTER UPDATE COMPLETION AND BEFORE REPLACEMENT) | | |
| | CD-R (DURING DATA ACQUISITION) | EXECUTE ONLY SUBSEQUENT EVENT (COMPARE VERSION OF INCREMENTAL UPDATE DATA THAT HAS BEEN RECORDED ON CD-R AFTER COMPREHENSIVE UPDATING HAS COMPLETED, AND UPDATE IF NECESSARY) | EXECUTE SUBSEQUENT EVENT, AND RESTART PRIOR EVENT AFTER ACC IS TURNED ON |
| | CD-R (DURING SUSPENSION OF DATA ACQUISITION) | | |
| | CD-R (DURING UPDATE) | | |
| | CD-R (DURING SUSPENSION OF UPDATE) | | |
| | CD-R (AFTER UPDATE COMPLETION AND BEFORE REPLACEMENT) | | |
| | COMPREHENSIVE UPDATING | NO CONFLICT | NO CONFLICT |

FIG. 10
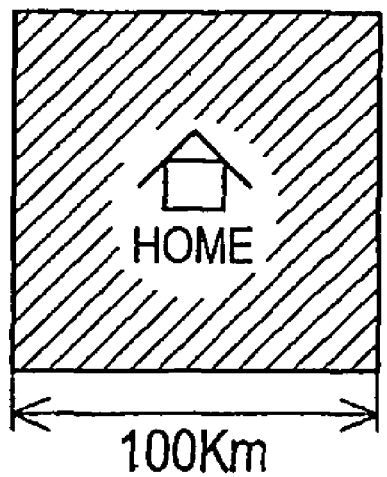
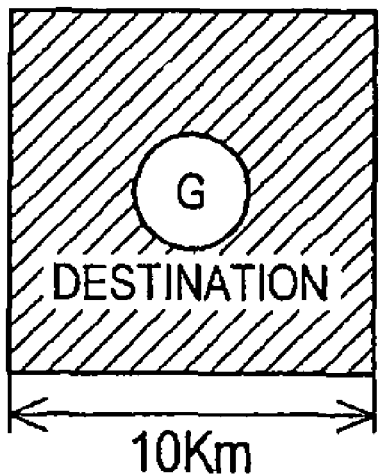

MAP UPDATING SYSTEM

INCORPORATION BY REFERENCE

This application is a National Phase of International Patent Application No. PCT/JP2007/067362, filed Aug. 30, 2007, which claims priority of Japanese Patent Application No. 2006-237182, filed Sep. 1, 2006. The disclosure of these applications are herein incorporated in their entirety.

BACKGROUND

1. Related Technical Fields

Related technical fields include map updating systems that update a part or all of the map data that is stored in a navigation apparatus, or the like, to new map data that is based on updated data.

2. Related Art

In recent years, navigation apparatuses that carry out travel guidance for vehicles and enable drivers to easily arrive at a desired destination are frequently mounted in vehicles. Throughout the application, the term "navigation system" denotes an apparatus that detects the current position of a vehicle by using a GPS receiver or the like, and displays map data that corresponds to this current position on a monitor; the map data being acquired through a recording medium such as a DVD-ROM, an HDD, or through a network. In addition, the map data, which includes the current position of the vehicle, is read out from the recording medium, and based on the map data, a map image of the vicinity of the current position of the vehicle is rendered and displayed in a display apparatus. In addition, a vehicle position marker (location) is superimposed on the displayed map image, and either the map image scrolls depending on the movement of the vehicle or the map image is held stationary on the screen and the vehicle position marker moves. Thereby, it is possible to understand at a glance the location through which the vehicle is currently traveling.

New roads (newly constructed roads) are built every year all over Japan. In addition, existing roads are closed or the configurations of existing roads are modified. Therefore, the map data that is stored in the navigation apparatus must be updated at a certain time interval. The updating of the map data is carried out by purchasing a new DVD and using it to replace an old DVD, or overwriting the content of a HDD based on map data that is distributed from a map data distribution center or the like. Presently, the following two updating methods are used when the content of the HDD is overwritten.

In a first method, when there is an update related to a road or the like, incremental update data, in which only the modified portions of the roads have been updated, is generated at a map data distribution center. When there is incremental update data that is related to a particular area (for example, areas in the vicinity of a registered residence) for which updating appears to be necessary in each navigation apparatus, the map data is updated to the new map data by using this incremental update data (below, referred to as "incremental updating") (refer, for example, to Japanese Patent Application Publication No. JP-A-2004-198841).

In a second method, periodically (for example, at one year intervals), comprehensive update data, in which map data for the entire country is updated by new map data that reflects the current road conditions, is produced by a map data distribution center, and the map data is completely updated to the new map data by using the comprehensive update data that has been produced (below, referred to as "comprehensive updating").

With respect to incremental updating, the following plurality of types of updating methods are available in which the methods for acquiring the incremental update data that has been produced by a map data distribution center differ.

(1) An updating method in which incremental update data is acquired from a center by using an automobile communication module that is mounted in the vehicle in advance, and updating is carried out automatically when, for example, the ACC is turned ON, during a residence registration, or when setting a destination.

(2) An updating method in which the user carries out particular operations while a mobile telephone is connected to a navigation apparatus, thereby the incremental update data is acquired by using the communication function of the mobile telephone, and updating is carried out based on the acquired incremental update data.

(3) An updating method in which the user's PC or an operator downloads the incremental update data from a center through an internet line, and the downloaded incremental update data is recorded on a CD-R; the updating is carried out by inserting the recorded CD-R into the navigation apparatus and reading the CD-R.

SUMMARY

Because the incremental updating or the comprehensive updating are each carried out independently by the three types of updating methods described above, there is a concern that the timing at which the updates are carried out may overlap. At this time, when uniformly carrying out an update that is only based on the updating method whose updating has started earlier, and all updates are carried out in the order in which the updates are started, the necessary communication processing with a center or the updating processing of the map data may be stopped, or in contrast, the unnecessary communication processing with a center or updating processing of the map data may be carried out, and the map data may be updated to map data that differs from the intention of the user.

Various exemplary implementations of the broad principles described herein provide systems, methods and programs that update map data. The systems, methods, and programs store map data and a priority sequence table, acquire first update data and second update data of the map data according to the priority sequence table, and update the map data based on the first update data and second update data according to the priority sequence table.

BRIEF DESCRIPTION OF THE DRAWINGS

Exemplary implementations will now be described with reference to the accompanying drawings, wherein:

FIG. 5 is a drawing that shows a first exemplary priority sequence table;

FIG. 6 is a drawing that shows a second exemplary priority sequence table;

FIG. 7 is a drawing that shows a third exemplary priority sequence table;

FIG. 8 is a drawing that shows a fourth exemplary priority sequence table;

FIG. 10 is a drawing that shows an exemplary update object area when carrying out incremental updating.

DETAILED DESCRIPTION OF EXEMPLARY IMPLEMENTATIONS

A map updating system will be explained below with reference to the drawings.

Figure 1:
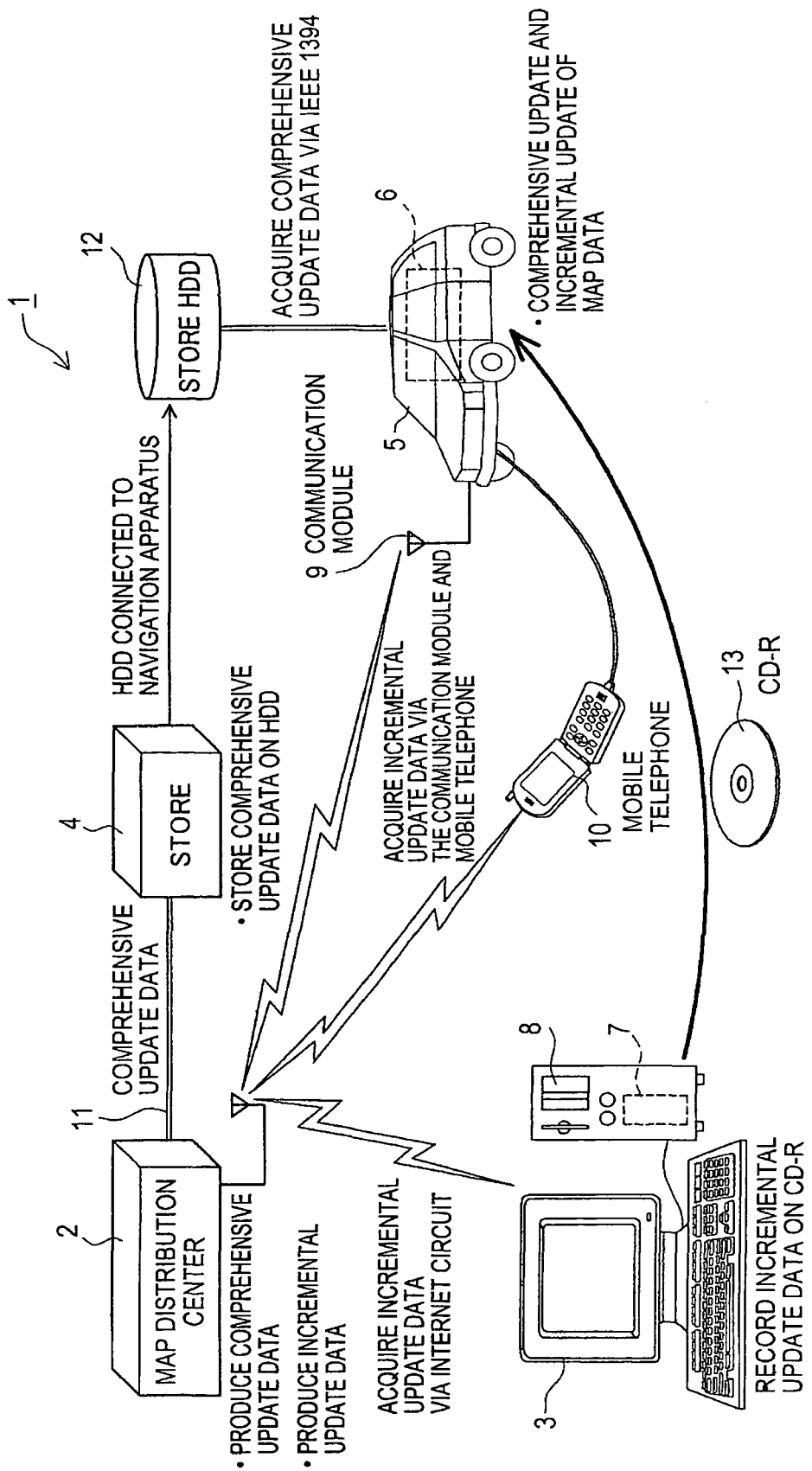
FIG. 1 is a schematic drawing that shows an exemplary map updating system.
Figure 2:
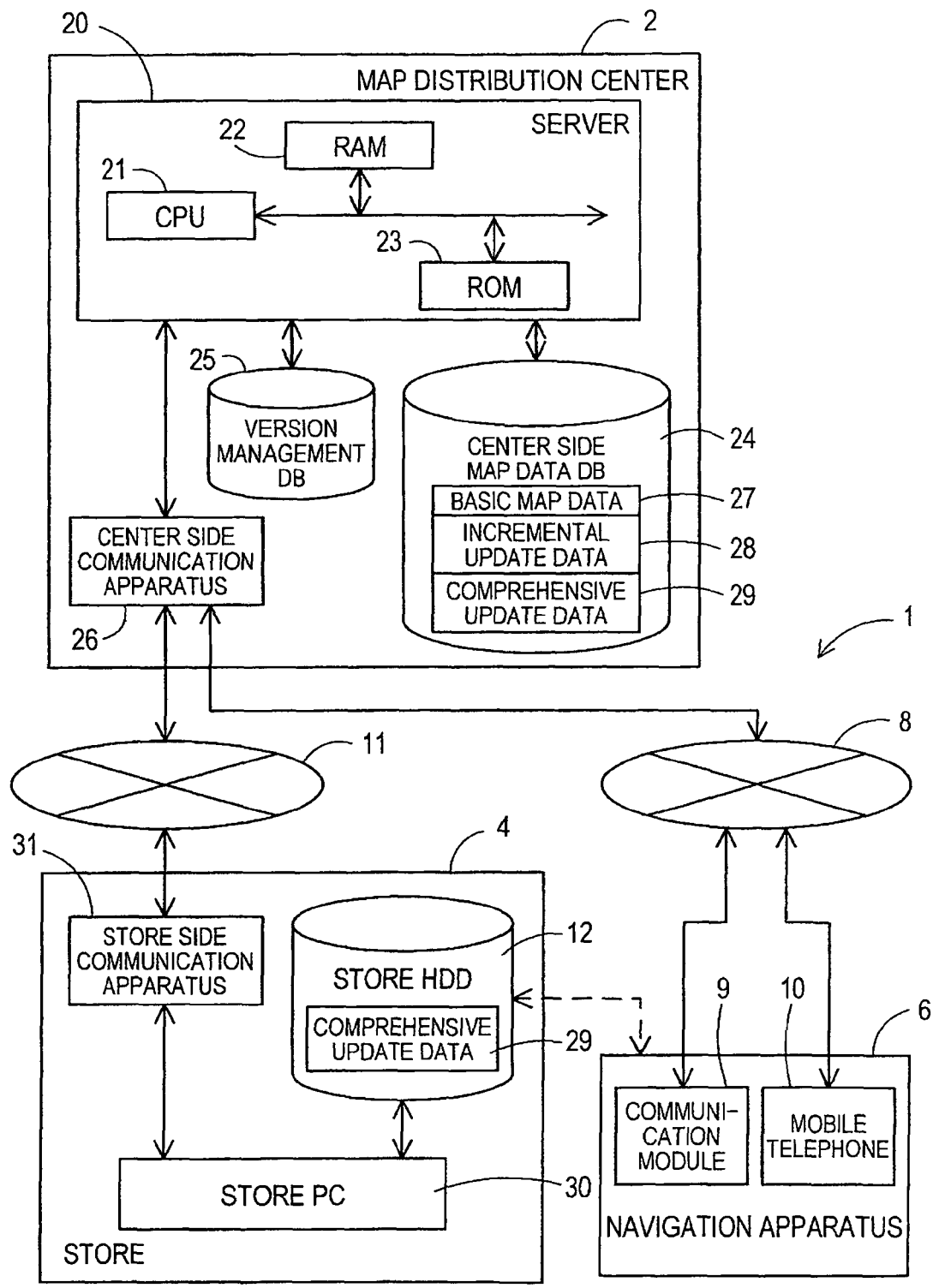
FIG. 2 is a block diagram that shows exemplary components of the map updating system.

The schematic structure of the map updating system 1 will be explained with reference to FIG. 1 and FIG. 2. FIG. 1 is a schematic structural drawing that shows an exemplary map updating system 1, and FIG. 2 is a block diagram that shows exemplary components of the map updating system 1.

As shown in FIG. 1, the map updating system 1 is basically structured by a map distribution center 2, a user PC (personal computer) 3, a store 4, and a navigation apparatus 6 (refer to FIG. 4) that is installed in the vehicle 5.

Here, the map distribution center 2 is a distribution center that carries out the production of update data (providing two types of data: incremental update data and comprehensive update data) for updating an old version of the map data to a new version of the map data, and carries out the distribution of the data that has been produced.

The user PC 3 is a PC that belongs to a user and is provided with a HDD (hard disk drive) 7 that stores data and a CD-R drive 8 that records the data that has been stored on the HDD onto the CD-R 13.

The store 4 is a supply facility that maintains update data that has been distributed from the map distribution center 2, and supplies this update data to the users that come to the store.

The navigation apparatus 6 is a vehicle-mounted device that is mounted in the vehicle 5 and displays maps of the vicinity of the position of the guided vehicle based on the stored map data, and carries out searches and guidance related to routes to a destination that has been set.

The map distribution center 2 and the navigation apparatus 6 are structured so as to be able to carry out two-way communication by using a communication device, such as a vehicle communication module 9 (below, simply referred to as a "communication module 9"), that is mounted in a vehicle in advance, and a mobile telephone 10 and the like, and various types of data, such as incremental update data and the like, can be sent and received therebetween. Note that incremental update data denotes update data that is produced at the map distribution center 2 for updating only specified areas in the map data that are stored in the navigation apparatus 6 (below, referred to as "incremental updating").

The map distribution center 2 and the user PC 3 are structured to communicate via a communication network such as the Internet line or the like, and send and receive various types of data, such as incremental update data, therebetween. In addition, a structure is used in which the incremental update data that has been downloaded from the map distribution center 2 is temporarily stored on the HDD 7, and then the stored data is recorded on a CD-R 13 to be read by the navigation apparatus 6. Thereby, it is possible to transfer the incremental update data to the navigation apparatus 6. Note that, instead of the user PC 3, an operator may carry out the acquisition of the incremental update data from the map distribution center 2 and record the incremental update data on a CD-R 13. In addition, it is possible to transfer incremental update data to the user's navigation apparatus 6 by an operator distributing the recorded CD-R 13 to the user.

In contrast, the map distribution center 2 and the store 4 are structured so as to enable two-way communication via a network 11 such as a communication satellite, and various types of data, such as the comprehensive update data and the like, are sent and received therebetween. Here, the term "comprehensive update data" denotes update data that is produced by the map distribution center 2 for updating all of the areas of the map data that are stored on the navigation apparatus 6 (below, referred to as "comprehensive updating").

The store 4 is structured such that the store HDD 12, which is a memory medium that is connected to a store PC 30, can be removed. In addition, the store 4 and the navigation apparatus 6 are structured so as to enable the transfer of the various types of data, such as comprehensive update data, by connecting the removed store HDD 12 to the navigation apparatus 6 under IEEE 1394 (Institute of Electrical and Electronic Engineers 1394) standards or the like.

The navigation apparatus 6 is structured so as to enable incremental updating and comprehensive updating of the stored map data by using the incremental update data or the comprehensive update data that has been acquired from the store 4 or the CD-R 13. Furthermore, the navigation apparatus 6 is able to carry out route searching and guidance based on the stored map data. Note that an exemplary structure of the navigation apparatus 6 will be explained below in detail with reference to FIG. 4.

Next, an exemplary map distribution center 2 that forms the map updating system 1 will be explained in detail with reference to FIG. 2.

As shown in FIG. 2, the map distribution center 2 is provided with a server 20, a center side map data DB 24, which serves as a data recording portion that is connected to the server 20, a version management DB 25, and a center side communication apparatus 26. In addition, the server 20 is provided with a CPU 21 that serves as an arithmetic apparatus and a control apparatus that carries out overall control of the server 20, internal memory apparatuses such as a RAM 22 that is used as a working memory when the CPU 21 carries out various types of arithmetic processing, a ROM 23 on which is recorded various types of control programs, such as an update data producing process that produces comprehensive update data and incremental update data based on the old version of the map data and the new version of the map data, and a map data distribution process that distributes the comprehensive update data and the incremental update data to the store 4 and navigation apparatus 6. Note that an MPU or the like may be used instead of the CPU 21.

The basic map data 27 is classified and stored according to the version in center side map database DB 24. This basic map data 27 is map data that is produced based on input data that is from an external unit and input operations, and that serves as the basis when the map data that is stored in the navigation apparatus 6 is updated. The term "version" denotes the production period data for specifying the period during which the map data was produced, and it is possible to specify the period during which the map data was produced by referring to the version. In addition, the incremental update data 28 and the comprehensive update data 29 are each classified according to the version and stored in the center side map database DB 24. The incremental update data 28 is produced by the server 20 based on the basic map data 27 and is for incrementally updating a portion of the map data that is stored in the navigation apparatus 6 by a new version of the map data. Similarly, the comprehensive update data 29 is produced by the server 20 based on the basic map data 27 and is for updating all of the map data that is stored in the navigation apparatus 6 by a new version of the map data.

Note that the basic map data 27, the incrementally update data 28, and the comprehensive update data 29 will be explained in detail below.

The data related to each version of the map data that is stored in one of the navigation apparatuses 6 is recorded in the version management DB 25. Here, in the map data, various types of data that is necessary for route guidance and map display are recorded. The map data is structured, for example, by map display data for displaying maps, intersection data related to intersections, node data related to node points, link data that is related to roads (links), search data for searching for routes, facility data that is related to facilities, and search data for searching for sites.

In the map updating system 1, for example, version management is carried out on the map data in 2.5 square kilometer units. In addition, version management is carried out after further classifying the map data into three types, one for each road standard, even when the area is the same 2.5 square kilometers. Here, FIG. 3 is an explanatory drawing for explaining an exemplary mechanism of version control of the map data for the map updating system 1.

Figure 3:
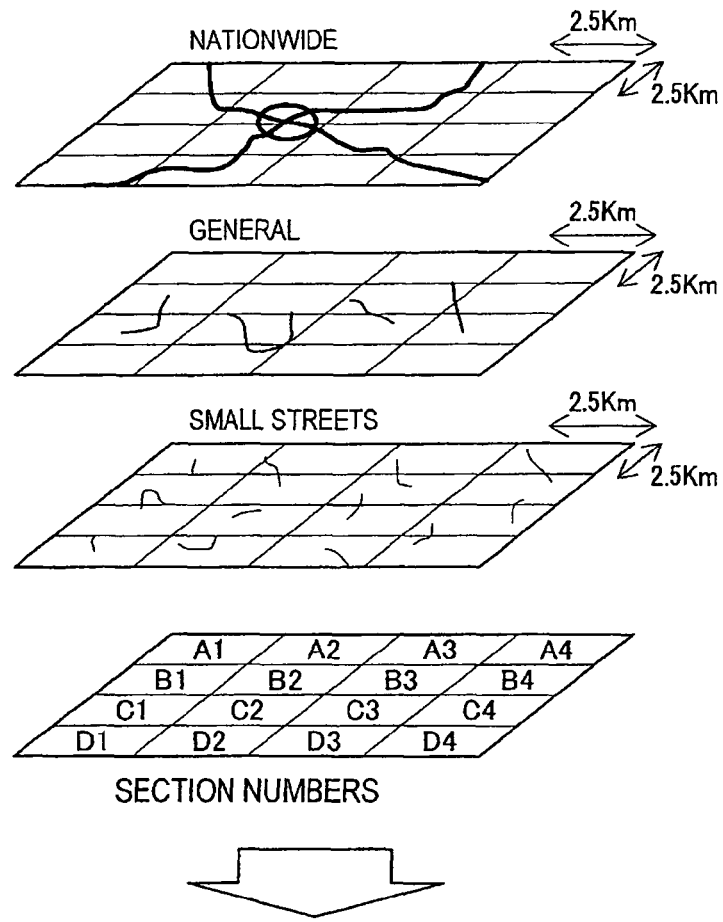
FIG. 3 is an explanatory diagram for explaining the scheme for the version management of the map data of the map updating system.

As shown in FIG. 3, when carrying out the management of the versions, a section ID (in FIG. 3, A1 to D4 for 16 areas) is set for each 2.5 square kilometer area, and furthermore, a version is associated with each of three distribution road divisions, which have been classified according to highway standards, and management is carried out. Specifically, the distribution road divisions for intercity highways, city highways, toll roads, and first and second class national roads, are classified as "national". In addition, the distribution road divisions for third class national roads, mainly regional roads, prefectural roads, or general roads, are classified as "general". In addition, the distribution road division for "secondary roads" is "secondary road". Therefore, versions for three types of map data are provided that depend on the object road type, even within the same area.

For example, in the area A1 that is shown in FIG. 3, the version of the map data where the distribution road division is "national" is "1," the version of the map data where the distribution road division is "general" is "0," and the version of the map data where the distribution road division is "secondary road" is "1."

The center side communication apparatus 26 is a communication apparatus for carrying out communication between the store 4 and the navigation apparatus 6 via the networks 11 and 13. Here, a communication system such as a communication network, for example, a LAN (local area network), WAN (wide area network), intranet, mobile telephone network, fixed line network, public telephone communication network, dedicated communication network, or the Internet, can be used as the networks 11 and 13. In addition, it is also possible to use a communication system that uses, for example, CS broadcasting, BS broadcasting, terrestrial digital television broadcasting, or FM multiplex broadcasting, which use a broadcast satellite. Furthermore, it is possible to use a communication system, for example, the non-stop automatic toll payment system (ETC) that is used in the highway communication system (ITS), or the narrow area communication system (DSCR).

As shown in FIG. 2, the store 4 is provided with a store PC 30, a store HDD 12 that serves as a data recording portion connected to the store PC 30, and a store side communication apparatus 31. In addition, the store PC 30 is a control unit that carries out communication and management of license data and fee data that is necessary to acquire the comprehensive update data from the map distribution center 2.

The comprehensive update data 29 that has been delivered from the map distribution center 2 is stored in the store HDD 12. Furthermore, the store HDD 12 is structured so as to be removable from the store PC 30 and such that the removed store HDD 12 is connected to the navigation apparatus 6, and thereby the comprehensive update data 29 that is stored in this store HDD 12 can be transferred between the store HDD 12 and the navigation apparatus 6. As will be described below, the navigation apparatus 6 can carry out comprehensive updating of the map data based on the comprehensive update data 29 that is stored on the store HDD 12.

The store side communication apparatus 31 is a communication apparatus for carrying out communication with the map distribution center 2 via the network 11 described above.

Figure 4:
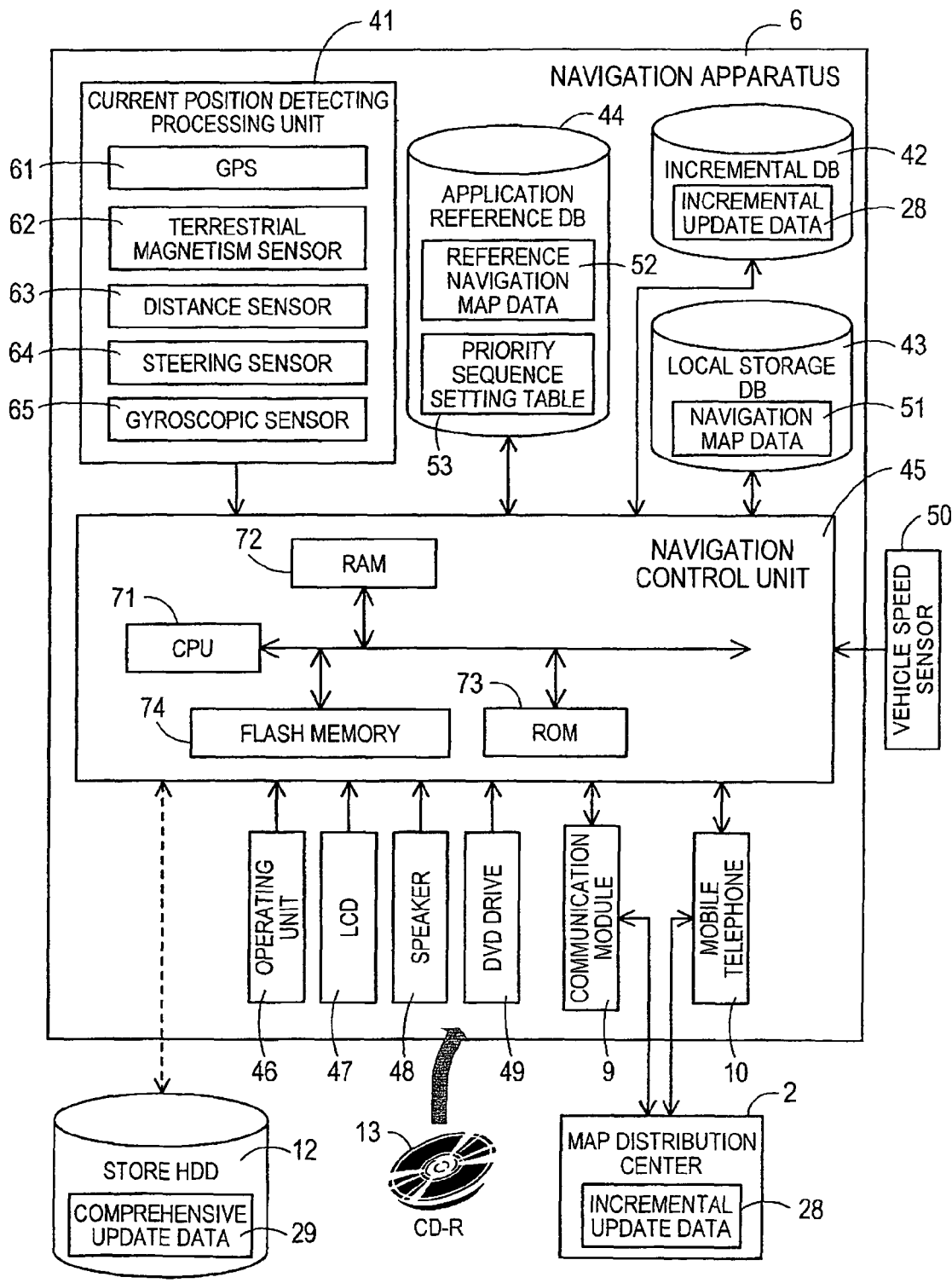
FIG. 4 is a block diagram that shows an exemplary structure of the navigation apparatus.

Next, an exemplary schematic structure of the navigation apparatus 6 that structures the map updating system 1 will be explained with reference to FIG. 4. FIG. 4 is a block drawing that shows the structure of the navigation apparatus 6.

As is shown in FIG. 4, the navigation apparatus 6 is structured by a current position detection processing unit 41 that detects the current position of the guided vehicle, an increment DB 42, a local storage DB 43, an application reference DB 44, a navigation control unit 45 that carries out various types of arithmetic processing based on input data, an operating unit 46 that receives operations from an operator, a liquid crystal display 47 that displays data such as maps to the operator, a speaker 48 that outputs audio guidance related to the route guidance, a DVD drive 49, which is a reading apparatus that can read a recording medium such as a CD or a DVD, and a communication module 9 and a mobile telephone 10 that carry out communication between a traffic data center such as the VICS center and the map distribution center 2. In addition, a speed sensor 50, which detects the travel speed of the guided vehicle, is connected to the navigation control unit 45. Furthermore, a connection interface for connecting the store HDD also is provided.

Below, in the explanation exemplary component elements that form the navigation apparatus 6, the current position detection process unit 41 includes a GPS 61, a terrestrial magnetism sensor 62, a distance sensor 63, a steering sensor 64, a gyroscopic sensor 65 that serves as a bearing detecting unit, an altimeter (not illustrated), and the like, and enables the detection of the current position, the bearing, the distance to a target (for example, an intersection) of the guided vehicle.

The GPS 61 detects the current position of the guided vehicle on the surface of the earth and the current time by receiving radio waves that are generated by artificial satellites, the terrestrial magnetism sensor 62 detects the guided vehicle bearing by measuring the terrestrial magnetism, and the distance sensor 63 detects the distance on a road between predetermined positions. It is possible to use as the distance sensor 63, for example, a sensor that measures the rotating speed of the wheels (not illustrated) of the guided vehicle and detects the distance based on the measured rotating speed, or a sensor that measures the acceleration and detects the distance by double integrating the measured acceleration.

The steering sensor 64 detects the steering angle of the guided vehicle. It is possible to use, for example, an optical rotation sensor that is installed on a rotating portion of the steering wheel (not illustrated), a rotation resistance sensor, an angle sensor that is installed on the wheels, or the like as the steering sensor 64.

The gyroscopic sensor 65 detects the turning angle of the guided vehicle. It is possible to use, for example, a gas rate gyroscope, an oscillation gyroscope or the like as the gyroscopic sensor 65. In addition, it is possible to detect the bearing of the guided vehicle by integrating the turning angle that has been detected by the gyroscopic sensor 65.

The increment DB 42 is a DB for storing the incremental update data 28 that has been acquired by using the communication module 9, the mobile telephone 10, or the CD-R 13. In addition, updating of the navigation map data 51 is carried out based on the incremental update data that is stored in the increment DB 42, which will be described below.

The local storage DB 43 is a DB in which the navigation map data 51 is stored. This navigation map data 51 is update map information that is used to carry out updating based on the incremental update data 28 and the comprehensive update data 29. In addition, reference navigation map data 52 is generated by converting the navigation map data 51 that is stored in the local storage DB 43, which will be described below.

In addition to the reference navigation map data 52, which is used for travel guidance and the route searches by the navigation apparatus 6, and the priority sequence setting table 53 (refer to FIG. 5 to FIG. 8), which sets the priority sequence for updating, predetermined programs and the like are stored in the application reference DB 44. Note that in the present embodiment, a hard disk is used as an external storage apparatus and a memory medium for the increment DB 42, the local storage DB 43, and the application reference DB 44. However, in addition to a hard disk, it is possible to use an electromagnetic disk, such as a flexible disk, as the external storage apparatus. In addition, it is possible to use a memory card, an electromagnetic tape, an electromagnetic drum, DC, MD, DVD, optical disk, MO, IC card, optical card and the like as the external memory apparatus.

Similar to the basic map data 27 that has been described above, the navigation map data 51 and the reference navigation map data 52 are structured by various types of data that are necessary for route guidance and map display. They may be structured, for example, by map display data for displaying maps, intersection data that is related to intersections, node data that is related to node points, link data that is related to roads (links), retrieval data for retrieving routes, facility data that is related to facilities, and search data for searching for sites.

The navigation map data 51 is updated either by comprehensive updating, in which the map data for all areas nationwide is updated, or incremental updating, in which the map data for only particular areas is updated. In addition, the reference navigation map data 52 is similarly updated by converting the updated navigation map data 51. Note that the specific updating processes for the comprehensive updating and incremental updating will be explained in detail below by using a flowchart.

The navigation control unit 45 that structures the navigation apparatus 6 is provided with a CPU 71 that serves as an arithmetic apparatus and control apparatus for carrying out overall control of the navigation apparatus 6, and internal memory apparatuses such as a RAM 72 that is used as working memory when the CPU 71 carries out various types of arithmetic processing and that stores, for example, the route data that is used when searching for routes, a ROM 73 on which, in addition to control programs, a route guidance processing program in which the searching and guidance for routes are carried out based on reference navigation map data 52 and a map data update processing program (FIG. 9) in which incremental updating or comprehensive updating of the navigation map data 51 is carried out according to a priority sequence that has been set based on incremental updating data and comprehensive updating data, and the like are recorded, and a flash memory 74 that records the programs that have been read out from the ROM 73. Note that a semiconductor memory or magnetic core, for example, is used for the RAM 72, ROM 73, the flash memory 74 and the like. In addition, instead of the CPU 71, it is possible to use an MPU or the like as the arithmetic apparatus and control apparatus.

Next, exemplary details of the priority sequence setting table 53 will be explained in detail. FIG. 5 to FIG. 8 are diagrams that show a priority sequence setting table 53 according to the present embodiment. Here, the priority sequence setting table 53 is a table in which the priority sequence for each update is set depending four types of updating method that enable the updating of the navigation map data 51 and the reference navigation map data 52 in the map updating system 1.

The updating methods are the following:

(1) An updating method in which the navigation apparatus 6 automatically acquires incremental update data 28 from the map distribution center 2 via a vehicular communication module 9 when the ACC is turned ON, during residence registration, or while setting the destination, and carries out the incremental updating based on the acquired incremental update data 28.

(2) An updating method in which the incremental update data 28 is acquired by using the communication function of the mobile telephone 10 due to the user carrying out specific operations while the mobile telephone 10 is connected to the navigation apparatus 6, and carrying out incremental updating based on the acquired incremental update data 28.

(3) An updating method in which incremental updating is carried out by recording incremental update data 28 that has been downloaded via the user PC 3 or by an operator on a CD-R 13, acquiring the incremental update data 28 by inserting the recorded CD-R into a DVD drive 49, and reading the same.

(4) An updating method in which the navigation apparatus 6 is connected to the store HDD 12 on which the comprehensive update data 29 is stored, and the comprehensive updating is carried out for all areas of the map data 51 and the reference navigation map data 52 based on the comprehensive update data 29 that has been acquired via the store HDD 12.

Because the incremental updating and the comprehensive updating by using the four updating methods that are described above are carried out separately, there is a concern that the timings by which the updates are is carried out may overlap, and the presence of updating at this time and an order for updating are set by using the priority sequence setting table 53. Note that in the following explanations, a process for updating and the like that starts earlier in time is referred to as a "prior event," and a process for updating and the like that starts later in time is referred to as a "subsequent event."

For example, as shown in FIG. 5, in the case in which the acquisition of the data for the new incremental update data 28 by using the communication module 9 begins during an interruption of the acquisition of incremental update data 28 by using the communication module 9, and the case in which the "search conditions (that is, update object area) are the same" and "the version of the incremental update data during the interruption of the acquisition is the same as the version of the incremental update data that is subsequently acquired", the subsequent event is cancelled, and only the incremental updating by using the communication module 9 that occurred during an interruption of the acquisition, which is the prior event, is executed. This is because the updating of the subsequent event is completely identical to the updating of the prior event, and it is not necessary to carry out the updating of the same content twice. Note that among the cases in which the acquisition of the incremental update data 28 is interrupted, there is the case in which the communication conditions deteriorate because the vehicle has entered a tunnel.

In the case in which the "search conditions (that is, the update object area) are the same" and "the version of the incremental update data that is subsequently acquired is newer than the version of the incremental update data during an interruption of the acquisition", the incremental updating by using the communication module 9, that occurred during an interruption of the acquisition, which is the prior event, is stopped, and the updating of the sequent event is executed. This is because the updating of the subsequent event is updating to map data that is newer than that which was included in the updating of the prior event.

In the case in which the "search conditions (that is, the update object area) are different", after acquiring the incremental update data 28 by using the communication module 9 during an interruption of the acquisition, which is the prior event, updating the navigation map data 51, carrying out the conversion of the data to reference navigation map data 52, acquiring, updating, and converting of the incremental update data 28 by using the communication module 9, which are subsequent events, are also carried out. Subsequently, an update confirmation screen, in which the user confirms whether or not to carry out the updating of the map data, is displayed in the liquid crystal display 47, and in the case in which carrying out the update is selected, the replacement of the DB by the incremental updating of the prior event and the subsequent event is carried out altogether.

As shown in FIG. 5, in the case in which the acquisition of the data for the new incremental update data 28 by using the communication module 9 is started during the updating or during an interruption of the updating of the new incremental update data 28 by using the communication module 9, after executing the incremental updating by using the communication module 9, which is the prior event, and carrying out the conversion of the data to reference navigation map data 52, the acquisition, updating, and conversion of the incremental update data 28 by using the communication module 9, which are subsequent events, are also carried out. Subsequently, an update confirmation screen, in which the user confirms whether or not to carry out the updating of the map data, is displayed on a liquid crystal display 47, and in the case in which carrying out the updating has been selected, the replacement of the DB by the incremental updating of the prior event and the subsequent event is carried out altogether. Note that in the case in which the updating of the incremental update data 28 is interrupted, there is an interval until the update restoration processing that is carried out in the case in which, for example, the ACC has been temporarily turned OFF during updating and subsequently turned ON.

As shown in FIG. 5, in the case in which the acquisition of the data for the new incremental update data 28 by using the communication module 9 has started before the updating of the incremental update data 28 by using the communication module 9 has completed and the replacement of the DB has been carried out, and in "the case in which communication starts because the subsequent event is the turning ON of the ACC", the acquisition, the updating, conversion, and replacement of the incremental update data 28 by using the communication module 9, which are subsequent events, are also carried out after the replacement of the DB when using the communication module 9, which is the prior event, is carried out.

In "the case in which the communication of the subsequent event has been started under other conditions (for example, the case in which the residence has been registered or the case in which a destination has been set)", the replacement of the DB is carried out altogether after the acquisition, the updating, and the conversion of the incremental update data 28 by using the communication module 9 are carried out.

As shown in FIG. 5, in the case in which the acquisition of data for the new incremental update data 28 by using the communication module 9 starts during the acquisition, during the updating, during an updating interruption, or after the completion of the updating and before the replacement of incremental update data 28 by using the CD-R 13, the subsequent events are cancelled, and only incremental updating that occurred during the acquisition, during the updating, or during an updating interruption by using the CD-R 13, which are the prior events, is executed. This is in order to prevent updating to map data that differs from the intention of the user because the updating of the map data that used the CD-R 13 is updating that is based on the intention of the user.

As shown in FIG. 5, in the case in which the acquisition of data for the new incremental update data 28 by using the communication module 9 is started during an interruption of the acquisition of the incremental update data 28 by using the CD-R 13, the incremental updating by the CD-R 13 that occurred during an interruption of the acquisition, which is the prior event, is stopped, and the updating of the subsequent event is executed. This is because the updating of the prior event cannot be executed since the case in which the acquisition is interrupted is the case in which the CD-R 13 has been ejected from the DVD drive 49.

Note that during the acquisition of the incremental update data 28 by using the communication module 9, it is structurally impossible for the acquisition of the data for the new incremental update data 28 by using the communication module 9 to start, and thus there is no concern that updates will conflict, and the priority sequence is not set.

Starting the acquisition of the data for the new incremental update data 28 by using the communication module 9 during the acquisition of the incremental update data 28 by using the mobile telephone 10 is restricted by the navigation apparatus 6, and thus there is no concern that the updates will conflict, and the priority sequence is not set.

Because the communication operation is not carried out while connected to the store HDD 12, there is no concern that the updating will be in conflict while comprehensive updating is carried out based on the comprehensive update data 29, and thus the priority sequence is not set.

As shown in FIG. 6, in the case in which the acquisition of the data for the new incremental update data 28 by using the mobile telephone 10 is started during an interruption of the acquisition of incremental update data 28 by using the mobile telephone 10, and in the case in which the "search conditions (that is, the update object areas) are the same" and "the version of the incremental update data that is acquired subsequently is identical to the version of the incremental update data during an interruption of the acquisition", the subsequent event is cancelled and only the incremental updating by using the mobile telephone 10 that occurred during an interruption of the acquisition, which is the prior event, is executed. This is because the updating of the subsequent event has update content that is exactly identical to the update of the prior event, and it is not necessary to carry out the updating of the same content twice. Note that among the cases in which the acquisition of the incremental update data 28 is interrupted, there is the case in which, for example, the communication conditions deteriorate after the vehicle has entered a tunnel or the like.

In the case in which the "search conditions (that is, the update object areas) are the same" and "the version of the incremental update data that has been acquired subsequently is newer than the version of the incremental update data during an interruption of acquisition", the incremental updating that occurred when using the mobile telephone 10 during an interruption of the acquisition, which is the prior event, is stopped, and the updating of the subsequent event is executed. This is because if the updating of the subsequent is carried out, this is updating to map data that is newer than that which is included in the updating of the prior event.

In the case in which the "search conditions (that is, the update object area) are different", the incremental updating when using the mobile telephone 10 that occurred during an interruption of the acquisition, which is the prior event, is stopped, and the update of the subsequent event is executed. This is in order to prevent an updating to map data that differs from the intention of the user because the updating of the map data when using the mobile telephone 10 is an update that is based on the intention of the user.

As shown in FIG. 6, in the case in which the updating of the incremental update data 28 when using the mobile telephone 10 has ended and the acquisition of the data for the new incremental update data 28 by using the mobile telephone 10 has started before replacement has been carried out, the acquisition, the updating, and the conversion of the incremental update data 28 when using the mobile telephone 10, which are subsequent events, are carried out, and then the replacement of the DB when using the mobile telephone 10, which is the prior event, and the replacement of the DB when using the mobile telephone 10, which is the subsequent event, are carried out altogether.

As shown in FIG. 6, in the case in which the acquisition of the data for the new incremental update data 28 by using the mobile telephone 10 is started during an interruption of the acquisition of the incremental update data 28 by using the CD-R 13, the incremental updating when using the mobile CD-R 13 that occurred during an interruption of the acquisition, which is the prior event, is stopped, and the updating of the subsequent event is executed. This is because the updating of the prior event cannot be executed since the case in which the acquisition has been interrupted is a case in which the CD-R 13 has been ejected from the DVD drive 49.

As shown in FIG. 6, in the case in which the acquisition of the data for the new incremental update data 28 by using the mobile telephone 10 is started after the updating of the incremental update data 28 when using the CD-R 13 has completed and before the replacement of the DB has been carried out, the replacement of the DB when using the CD-R 13, which is the prior event, and the replacement of the DB when using the mobile telephone 10, which is the subsequent event, are carried out together after the acquisition, the updating, and the conversion of the incremental update data 28 when using the mobile telephone 10, which are subsequent events, are carried out. This is in order to prevent the updating of the map data that differs from the intention of the user because the updating of the map data that has used the CD-R 13 and the updating of the map data that has used the mobile telephone 10 are both updates that are based on the intention of the user.

Note that the starting of the acquisition of the data for the new incremental update data 28 when using the mobile telephone 10 during the acquisition of the incremental update data 28 when using the communication module 9 is restricted by the navigation apparatus 6, and thus there is no concern that the updates will conflict, and a priority sequence is not set.

Starting the acquisition of the data for the new incremental update data 28 when using the mobile telephone 10 during the acquisition of the incremental update data 28 when using the mobile telephone 10 is structurally impossible, and thus there is no concern that the updates will conflict, and a priority sequence is not set.

The necessary operations for the map data updating when using the mobile telephone 10 cannot be carried out during the updating and during an interruption of the updating of the incremental update data 28 when using the mobile telephone 10, and thus the acquisition of the data for the new incremental update data 28 when using the mobile telephone 10 is not started, there is no concern that updates will conflict, and a priority sequence is not set.

Starting the acquisition of the data for the new incremental update data 28 when using the mobile telephone 10 during the acquisition, during the updating, or during an interruption of the updating of the incremental update data 28 when using the CD-R 13, is restricted by the navigation apparatus 6, and thus there is no concern that the updates will conflict, and a priority sequence is not set.

Because the communication operation is not carried out while the store HDD 12 is connected, there is no concern that updates will conflict while a comprehensive updating is being carried out based on the comprehensive update data 29, and a priority sequence is not set.

As shown in FIG. 7, in the case in which the acquisition of the incremental update data is started after the CD-R 13 has been inserted into the DVD drive 49 during the acquisition or during an interruption of the acquisition of the incremental update data 28 by using the communication module 9, the incremental updating when using the communication module 9 that occurred during the acquisition or during an interruption of the acquisition, which is the prior events, is stopped, and the updating of the subsequent event is executed. This is in order to prevent updating to map data that differs from the intention of the user because the updating of the map data by using the CD-R 13 is an updating based on the intention of the user.

As shown in FIG. 7, in the case in which the acquisition of the incremental update data has started after the CD-R 13 has been inserted into the DVD drive 49 during the updating, during an interruption of the updating, or after the completion of the updating and before the replacement of the incremental update data 28 when using the communication module 9, after carrying out the updating and conversion of the map data when using the communication module 9, which is the prior event, the continued insertion of the CD-R 13 is set as a condition, the acquisition, the updating, and the conversion of the incremental update data 28 when using the CD-R 13, which are subsequent events, are carried out, and the replacement of the DB by using the incremental updates, which are the prior event and the subsequent event, is carried out altogether.

As shown in FIG. 7, in the case in which the acquisition of the incremental update data has started after the CD-R 13 has been inserted into the DVD drive 49 during the acquisition or during an interruption of the acquisition of the incremental update data 28 when using the mobile telephone 10, the incremental updating when using the mobile telephone 10 that occurred during an interruption of the acquisition, which is the prior event, is stopped, and the updating of the subsequent event is executed. However, because the updating of the map data that has used the mobile telephone 10 is an update that is based on the intention of the user and the user also pays the communication fee, the user confirms whether the update in the prior event should be stopped, and the updating when using the mobile telephone 10 is stopped only in the case in which the consent of the user has been obtained.

As shown in FIG. 7, in the case in which the acquisition of the incremental update data has started after the CD-R 13 has been inserted into the DVD drive 49 during the updating, during an interruption of the updating, or after the completion of the updating and before the replacement of the incremental update data 28 when using the mobile telephone 10, after carrying out the updating and conversion of the map data when using the mobile telephone 10, which is the prior event, the continued insertion of the CD-R 13 is set as a condition, the acquisition, the updating, and the conversion of the incremental update data 28 when using the CD-R 13, which are subsequent events, are carried out, and the replacement of the DB by incremental updates of the prior event and the subsequent event, are carried out altogether.

As shown in FIG. 7, in the case in which the acquisition of the incremental update data has started after the CD-R 13 has been inserted into the DVD drive 49 during an interruption of the acquisition of the incremental update data 28 by using the CD-R 13, the incremental updating when using the CD-R 13 that occurred during an interruption of the acquisition, which is the prior event, is stopped, and the updating of the subsequent event is executed. This is because the updating of the prior event cannot be executed since the case in which the acquisition is interrupted is the case in which the CD-R has been ejected from the DVD drive 49.

As shown in FIG. 7, in the case in which the acquisition of the incremental update data has started after the CD-R 13 has been inserted into the DVD drive 49 during the updating, during an interruption of the updating, or after the completion of the updating and before the replacement of the incremental update data 28 when using the CD-R 13, after the acquisition, the updating, and the conversion of the incremental update data 28 when using the CD-R 13, which are subsequent events, have been carried out, the replacement of the DB when using the CD-R 13, which is the prior event, and the replacement of the DB when using the CD-R 13, which is the subsequent event, are carried out altogether. This is because the updating of both the prior event and the subsequent event can be carried out even in the case that the CD-R 13 is switched since the prior event is due to the reading of the data of the CD-R 13 having completed.

Note that starting the acquisition of the data for the new incremental update data 28 by using the CD-R 13 during the acquisition of incremental update data 28 when using the CD-R 13 is note possible due to the structure of the DVD drive 49, and thus there is no concern that the updates will conflict and the priority sequence is not set.

The communication operation is not carried out while the store HDD 12 is connected, and thus there is no concern that updates will conflict wile carrying out comprehensive updating that is based on the comprehensive update data 29, and the priority sequence is not set.

As shown in FIG. 7, in the case in which an operation in which the CD-R 13 is ejected from the DVD drive 49 is carried out during an interruption of the acquisition of the incremental update data 28 by the CD-R 13, the inserted CD-R 13 is ejected. Note that in the case in which the CD-R 13 is inserted again, the acquisition of the data starts again from the beginning.

As shown in FIG. 7, in the case in which an operation in which the CD-R 13 is ejected from the DVD drive 49 is carried out during the updating, during an interruption of the updating, or after the completion of the updating and before the replacement of the incremental update data 28 when using the CD-R 13, after the inserted CD-R 13 has been ejected, the updating, conversion, and replacement of the incremental update data 28 when using the CD-R 13, which are prior events, are also carried out. This is because the updating of the prior event can be carried out even in the case in which the CD-R 13 has been ejected since the prior event is due to the reading of the data from the CD-R 13 having completed.

Note that during the updating of incremental update data 28 or comprehensive updating when using the communication module 9 or the mobile telephone 10, a priority sequence is not set for the case in which the operation of ejecting the CD-R 13 has been carried out because the CD-R 13 is not used.

As shown in FIG. 8, in the case in which the comprehensive updating is started after the store HDD 12 has been connected to the navigation apparatus 6 during the acquisition or during an interruption of the acquisition of the incremental update data 28 when using the communication module 9, the incremental updating when using the communication module 9 that occurred during an interruption of the acquisition, which is the prior event, is stopped, and the updating of the subsequent event is executed. This is in order to prevent unnecessary communication and updating processing since the map data for all areas is overwritten by subsequent comprehensive updating even if that incremental updating, which is the prior event, has been carried out.

As shown in FIG. 8, in the case in which comprehensive updating is started after the store HDD 12 has been connected to the navigation apparatus 6 during the updating, during an interruption of the updating, or after the completion of the updating and before the replacement of the incremental update data 28 when using the communication module 9, the incremental updating when using the communication module 9 that occurred during updating, which is the prior event, is stopped, and the comprehensive updating, which is the subsequent event, is carried out. However, in the case in which the version of the incremental update data that has been acquired after the comprehensive updating has been carried out and the version of the map data after the comprehensive updating are compared and the version of the incremental update data is newer, after the comprehensive updating, incremental updating is carried out based on the incremental update data that has already been acquired. This is in order to prevent updating to an old version of the map data by the comprehensive updating.

As shown in FIG. 8, in the case in which the comprehensive updating is started after the store HDD 12 has been connected to the navigation apparatus 6 during the acquisition or during an interruption of the acquisition of the incremental update data 28 when using the mobile telephone 10, the incremental updating when using the mobile telephone 10 that occurred during an interruption of the acquisition, which is the prior event, is stopped, and the updating of the subsequent event is executed. This is in order to prevent unnecessary communication and updating processing since the map data for all areas has been overwritten by the subsequent comprehensive updating even if that incremental updating, which is the prior event, has been carried out.

As shown in FIG. 8, in the case in which the comprehensive updating is started after the store HDD 12 has been connected to the navigation apparatus 6 during the updating, during an interruption of the updating, or after the completion of the updating and before the replacement of the incremental update data 28 by using the mobile telephone 10, the incremental updating when using the mobile telephone 10 that occurred during updating, which is the prior event, is stopped, and the comprehensive updating, which is the subsequent event, is carried out. However, in the case in which the version of the incremental update data that has been acquired after the comprehensive updating has been carried out and the version of the map data after comprehensive updating are compared and the version of the incremental update data is newer, after the comprehensive updating, the incremental updating is carried out based on the incremental update data that has already been acquired. This is in order to prevent updating to an old version of the map data by comprehensive updating.

As shown in FIG. 8, in the case in which comprehensive updating is started after the store HDD 12 has been connected to the navigation apparatus 6 during the updating, during an interruption of updating, or after the completion of the updating and before the replacement of the incremental update data 28 when using the CD-R 13, the incremental updating when using the CD-R 13 that occurred during updating, which is the prior event, is stopped, and the comprehensive updating, which is the subsequent event, is carried out. However, in the case in which the version of the incremental update data that has been recorded on the CD-R 13 after the comprehensive updating has been carried out and the version of the map data after the comprehensive updating are compared and the version of the incremental update data is newer, the incremental updating is carried out based on the CD-R 13 after the comprehensive updating. This is in order to prevent updating to an old version of the map data by comprehensive updating.

Note that because another store HDD 12 cannot be connected while one store HDD 12 is connected, there is no concern that updates will conflict because another comprehensive updating will start when the comprehensive updating based on the comprehensive update data 29 is being carried, and the priority sequence is not set.

As shown in FIG. 8, when the ACC is turned off during the acquisition or during an interruption of the acquisition of the incremental update data 28 when using the communication module 9, the ACC is turned OFF, and the process is resumed the next time that the ACC is turned ON.

As shown in FIG. 8, when the ACC is turned OFF during updating, during an interruption of updating, or after the completion of the updating and before the replacement of the incremental update data 28 when using the communication module 9, the ACC is turned OFF, and the updating is restarted the next time that the ACC is turned ON. Note that in the case in which the updating has completed but replacement has not been carried out, an update confirmation screen, in which the user confirms whether or not to carry out the updating of the map data, is displayed on the liquid crystal display 47 after the ACC has been turned ON.

As shown in FIG. 8, when the ACC is turned OFF during the acquisition or during an interruption of the acquisition of the incremental update data 28 by using the mobile telephone 10, the ACC is turned OFF, and the acquisition of the incremental update data 28 is stopped.

As shown in FIG. 8, when the ACC is turned OFF during the updating, during an interruption of the updating, or after the completion of the updating and before the replacement of the incremental update data 28 when using the mobile telephone 10, the ACC is turned OFF, and the updating is restarted the next time that the ACC is turned ON. Note that in the case where the updating has completed but the data has not been replaced, an update confirmation screen in which the user confirms whether to carry out the updating of the map data is displayed on the liquid crystal display 47 after the ACC has been turned ON.

As shown in FIG. 8, when the ACC is turned OFF during the acquisition, during an interruption of the acquisition, or after the completion of the updating and before the replacement of the incremental update data 28 when using the CD-R 13, the ACC is turned OFF, and the updating is restarted the next time that the ACC is turned on.

Note that because the operation in which the ACC is turned OFF cannot be applied while the store HDD 12 is connected, there is no concern that the ACC will be turned OFF while comprehensive updating is being carried out based on the comprehensive update data 29, and a priority sequence is not set.

Figure 9:
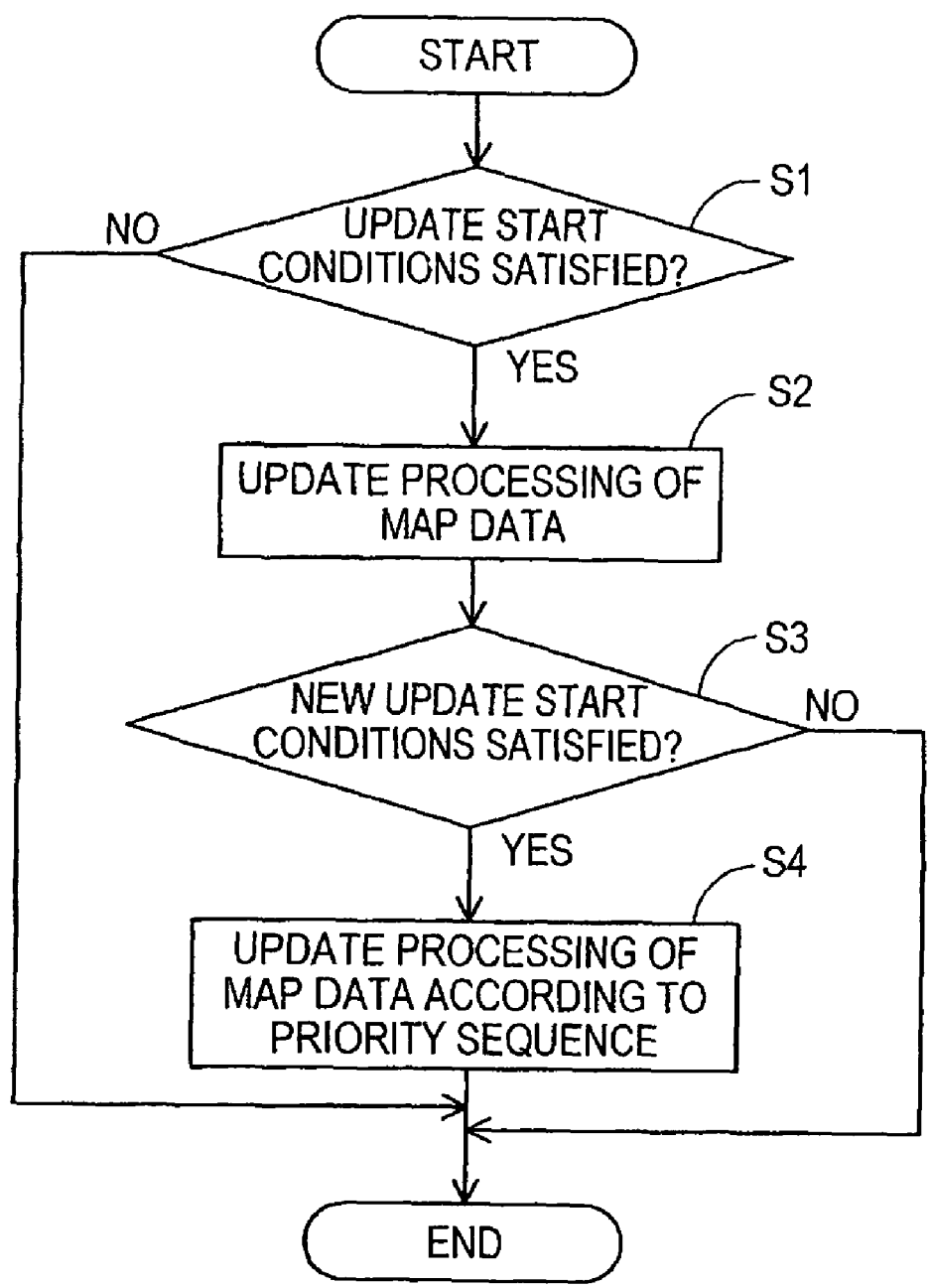
FIG. 9 is a flowchart of an exemplary map data updating method.

Next, an exemplary map data updating method, for example, in the form of a program that executed by the navigation control unit 45 of the navigation apparatus 6 in the map updating system 1 will be explained with reference to the flowchart illustrated in FIG. 9. The exemplary method may be implemented, for example, by one or more components of the above-described device. However, even though the exemplary structure of the above-described device may be referenced in the description, it should be appreciated that the structure is exemplary and the exemplary method need not be limited by any of the above-described exemplary structure.

Here, the map data updating method may be implemented as program that carries out incremental updating or comprehensive updating of the map data 51 according to a priority sequence that has been set in the priority sequence setting table 53 based on the incremental update data 28 that has been acquired via the communication module 9, the mobile telephone 10, the CD-R 13 or the like, and the comprehensive update data 29 that has been acquired via the store HDD 12. Note that the program that is shown in the flowchart in FIG. 9 is stored in the RAM 72 and the ROM 73 that are provided in the navigation apparatus 6, and are repeatedly executed at predetermined intervals (for example, every 200 ms) by the CPU 71.

In the map data updating processing program, first, in step 1 (below, "step" is abbreviated "S"), the CPU 71 determines whether or not the starting conditions, according to which the incremental updating or the comprehensive updating is started, are satisfied. Specifically, the incremental updating that has used the communication module 9 is started in the case in which either the ACC has been turned ON, the registration (including modification) of a residence has been carried out by using an operating unit 46, or a destination for a route search has been set by using the operating unit 46, is satisfied. In addition, the incremental updating that has used the mobile telephone 10 is started in the case in which the user has connected the mobile telephone 10 to the navigation apparatus 6 and a predetermined update starting operation has been carried out by using the operating unit 46. In addition, the incremental updating that has used the CD-R 13 is started in the case in which the CD-R 13, on which the incremental update data 28 has been recorded, has been inserted into the DVD drive 49. In addition, the comprehensive updating is started in the case in which the store HDD 12, on which the comprehensive update data 29 has been recorded, has been connected to the navigation apparatus 6.

In the case in which it has been determined that none of the starting conditions have been satisfied (S1: NO), the processing program ends, while in the case in which it has been determined that any one of the starting conditions have been satisfied (S1: YES), the processing proceeds to S2.

In S2, the CPU 71 carries out the updating of the navigation map data 51 and the conversion to the reference navigation map data 52 after acquisition of the incremental update data 28 or the comprehensive update data 29. Note that it is possible to acquire the incremental update data 28 from the map distribution center 2 by communication via the communication module 9 or the mobile telephone 10, or reading the CD-R 13, on which the incremental update data 28 has been recorded, using a DVD drive. In addition, it is possible to acquire the comprehensive update data 29 by accessing the store HDD 12, on which the comprehensive update data 29 has been recorded, via an IEEE 394 cable.

Note that in the incremental updating processing that is carried out by the map updating system 1 and that is based on using the communication module 9, in the incremental updating that is timed according to the ACC being turned ON, in particular, the map data for all areas whose distribution road division is classified as "national" (refer to FIG. 3) and, irrespective of the type of the distribution road division, the map data for an area of 100 square kilometers centered on the residence (refer to FIG. 10) are the objects of updating.

In the incremental updating that is timed according to a residence being registered (including changing), in particular, the map data for all areas whose distribution road division is classified as "national" (refer to FIG. 3) and, irrespective of the type of the distribution road division, the map data for an area of 100 square kilometers centered on the residence (refer to FIG. 10) are the objects of updating.

In the incremental updating that is timed according to a destination being set, in particular, the map data for all areas whose distribution road division is classified as "national" (refer to FIG. 3) and, irrespective of the type of the distribution road division, the map data for an area of 10 square kilometers centered on the residence (refer to FIG. 10) are the objects of the updating.

Additionally, the map data for the respective areas is updated to a new version of the map data based on the incremental update data that has been sent from the map distribution center 2 in the case in which there are newly-constructed roads, modifications of the roads, or the like that are associated with a distribution road division in any of the areas has become the object of updating.

Next, in S3, the CPU 71 determines whether or not the starting conditions, according to which the incremental updating and the comprehensive updating are newly started, have been satisfied. Note that because the starting conditions are conditions identical to those in S1, here, the explanation thereof will be omitted.

As a result, in the case in which it has been determined that none of the starting conditions have been satisfied (S3: NO), the processing program is completed after the incremental updating or comprehensive updating of the map data that has been started in S2 has completed. In contrast, in the case in which it has been determined that any one of the starting conditions has been satisfied (S3: YES), the processing proceeds to S4.

In S4, based on the overlapping of the timings at which updating is carried out, the presence of updating of the prior event and the subsequent event and the order of the updating are set according to the priority sequence setting table 53 (FIG. 5 to FIG. 8), and updating is carried out. Note that the priority sequence setting table 53 has been explained with reference to FIG. 5 to FIG. 8, and thus the explanation thereof is omitted.

According to detailed explanation above, in the map updating system 1 according to the present embodiment, when the navigation apparatus 6 carries out incremental updating or comprehensive updating (S2) of the navigation map data 51 based on the incremental update data 28 or the comprehensive update data 29 that has been delivered from the map distribution center 2, in particular, even in the case in which the timings of the starting of the updating process overlap and the updates conflicts (S3: YES), updating is carried out after the presence of updates and the update sequence has been set according to the priority sequence setting table 53, and thus it is possible to update map data in line with the intentions of the user. In addition, because unnecessary communication and update processing are not carried out, it is possible to shorten the updating time and reduce the processing burden on the control apparatus.

Note that the invention is not limited by the present embodiment, and as a matter of course various improvements and modifications that are within a range that does not depart from the scope of the present invention are possible.

For example, the comprehensive updating of the map data contained in the navigation apparatus 6 is carried out by removing the store HDD 12 from the store PC 30 and connecting the same to the navigation apparatus 6. However, the comprehensive updating of the map data may be carried out by removing a HDD, on which each DB is stored, from the navigation apparatus 6 and connecting the same to the store PC 30.

An example was explained above for the case in which the map data that is contained in the navigation apparatus 6 is updated. However, the updating of the map data can be applied to an apparatus other than the navigation apparatus 6 under the condition that the apparatus contains map data.

The invention claimed is:

1. A map updating system, comprising:
   a map data storing unit that stores map data;
   a first acquiring unit that acquires first update data of the map data;
   a second acquiring unit that acquires second update data of the map data, wherein:
      the first acquiring unit acquires the first update data by a first communication method and the second acquiring unit acquires the second update data by a second communication method, and
      the first communication method and the second communication method are methods that use different communication apparatuses and different communication lines;
   an updating unit that updates the map data based on at least one of the first update data and the second update data;
   a plurality of priority sequence setting tables including a priority sequence for updating based on the first update data and updating based on the second update data which are executed by the updating unit; and
   a computer processor unit (CPU) that determines whether or not timings of the updating based on the first update data and the second update data overlap and the updating conflicts, wherein:
   if it is determined that the timings of the updating based on the first update data and the second update data overlap and the updating conflicts, the updating unit sets, based on the priority sequence setting table, an execution and a stop of the updating based on the first update data and the updating based on the second update data to update the map data;
   the priority sequence is set different according to a processing status of acquisition processing of the first update data by the first acquiring unit or update processing of the map data based on the first update data by the updating unit at a time when the acquisition of the second update data by the second acquiring unit has started; and
   the plurality of priority sequence setting tables are tables configured to provide priority sequences for each combination of the first communication method and the second communication method.

2. The map updating system according to claim 1, the priority sequence setting table defining operation of the updating unit when the acquisition of the second update data by the second acquiring unit starts during acquisition of the first update data by the first acquiring unit.

3. The map updating system according to claim 1, the priority sequence setting table defining operation of the updating unit when the acquisition of the second update data by the second acquiring unit starts during an interruption of the acquisition of the first update data acquired by the first acquiring unit.

4. The map updating system according to claim 1, wherein at least one of the first acquiring unit and the second acquiring unit acquires update data from a map distribution center by remote communication.

5. The map updating system according to claim 1, wherein at least one of the first acquiring unit and the second acquiring unit acquires update data from a recording medium.

6. The map updating system according to claim 1, comprising:
   a comparing unit that compares update object areas and a version of the first update data with update object areas and a version of the second update data, wherein
   the updating unit sets, based on a compared result of the comparing unit and the priority sequence setting table, an execution and a stop of the updating based on the first update data and the updating based on the second update data to update the map data.

7. A method for updating a map system, comprising:
   acquiring first update data and second update data of map data stored in a storing unit according to a plurality of priority sequence setting tables including a priority sequence for updating based on the acquired update data, wherein:
      the first update data is acquired by a first communication method and the second update data is acquired by a second communication method, and
      the first communication method and the second communication method are methods that use different communication apparatuses and different communication lines;
   updating the map data based on at least one of the first update data and the second update data according to the priority sequence setting table; and
   determining by a computer processor unit (CPU) whether or not timings of the updating based on the first update data and the second update data overlap and the updating conflicts, wherein:
   if it is determined that the timings of the updating based on the first update data and the second update data overlap and the updating conflicts, setting, based on the priority sequence setting table, an execution and a stop of the updating based on the first update data and of the updating based on the second update data to update the map data;
   setting the priority sequence different according to a processing status of the acquiring of the first update data or of the updating of the map data based on the first update data at a time when the acquiring of the second update data has started; and
   the plurality of priority sequence setting tables are tables configured to provide priority sequences for each combination of the first communication method and the second communication method.

8. The method for updating a map system according to claim 7, further comprising:
   prioritizing acquisition of the second update data during acquisition of the first update data.

9. The method for updating a map system according to claim 7, further comprising:
   prioritizing acquisition of the second update data during an interruption of the acquisition of the first update data.

10. The method for updating a map system according to claim 7, further comprising:
    acquiring at least one of the first update data and second update data from a map distribution center by remote communication.

11. The method for updating a map system according to claim 7, further comprising:
    acquiring at least one of the first update data and second update data from a recording medium.

12. A non-transitory computer-readable medium storing a computer-executable program usable to update map data, the program comprising:
    instructions for acquiring first update data and second update data of map data according to a plurality of priority sequence setting tables including a priority sequence for updating based on the acquired update data, wherein:
       the first update data is acquired by a first communication method and the second update data is acquired by a second communication method, and
       the first communication method and the second communication method are methods that use different communication apparatuses and different communication lines;
    instructions for updating the map data based on at least one of the first update data and the second update data according to the priority sequence setting table; and
    instructions for determining whether or not the timings of the updating based on the first update data and the second update data overlap and the updating conflicts, wherein:
    if it is determined that timings of the updating based on the first update data and the second update data overlap and the updating conflicts, setting, based on the priority sequence setting table, an execution and a stop of the updating based on the first update data and of the updating based on the second update data to update the map data;
    the priority sequence is set different according to a processing status of acquisition processing of the first update data by the instructions or update processing of the map data based on the first update data by the instructions at a time when the acquisition of the second update data by the instructions has started; and
    the plurality of priority sequence setting tables are tables configured to provide priority sequences for each combination of the first communication method and the second communication method.

* * * * *